Jan. 5, 1971 L. C. GOSS 3,553,662

POSITION SENSING AND CONTROL APPARATUS

Filed Sept. 8, 1967 3 Sheets-Sheet 1

INVENTOR
LLOYD C. GOSS

BY
Cushman, Darby & Cushman
ATTORNEYS

INVENTOR
LLOYD C. GOSS

BY
Cushman, Darby & Cushman
ATTORNEYS

POSITION SENSING AND CONTROL APPARATUS

Filed Sept. 8, 1967 3 Sheets-Sheet 3

INVENTOR
LLOYD C. GOSS

BY Cushman, Darby & Cushman
ATTORNEYS

United States Patent Office 3,553,662

Patented Jan. 5, 1971

3,553,662

POSITION SENSING AND CONTROL APPARATUS

Lloyd C. Goss, Bloomington, Minn., assignor to Control Data Corporation, Minneapolis, Minn., a corporation of Minnesota

Filed Sept. 8, 1967, Ser. No. 666,337
Int. Cl. G11b *5/48, 21/08;* H01f *21/06*
U.S. Cl. 340—174.1 9 Claims

ABSTRACT OF THE DISCLOSURE

The following specification discloses apparatus for accurately positioning a member at any one of a plurality of discrete major locations as well as a plurality of minor locations associated with each of the major locations. The apparatus comprises a stationary differential transformer, a position feedback transducer rod which constitutes the core of the differential transformer, an error signal generating circuit responsive to the output of the differential transformer and a servo positioning mechanism for maintaining the error signal at null. The feedback transducer rod comprises a non-magnetic rod having a plurality of transverse grooves machined therein at points corresponding to the major locations, these grooves being plated with a magnetic material. The error signal generating means is adapted to selectively generate a bogus error signal to cause the servo positioning mechanism to shift the member an amount proportional to the sense and magnitude of the bogus error signal.

The present invention relates to position sensing and control apparatus and more specifically to apparatus of this type wherein a given member is to be accurately positioned at any one of a plurality of discrete locations.

In information storage and retrieval systems, for example, wherein a plurality of magnetic recording tracks are disposed concentrically on a rotating disc, control means are required to accurately position the head bearing member, upon which a plurality of read/write heads are mounted, at any one of a plurality of discrete locations whereat each of the plurality of read/write heads are accurately located above particular ones of said recording tracks, from which or to which information is to be transferred. The present invention provides such a control apparatus.

In accordance with the present invention, a controllable drive mechanism is provided to impart translational movement to the head bearing member to effect the radial positioning thereof at any desired one of the plurality of discrete locations under the control of a rough positioning servo control apparatus. Once the head bearing member is roughly positioned at a desired location, a fine positioning control mechanism, constructed in accordance with the present invention, is actuated to control the drive mechanism to finely or accurately position the head bearing member at that location such that each read/write head is precisely located above a recording track.

The fine positioning control mechanism comprises a position transducer rod which is mechanically interconnected with the head bearing member so that the rod moves in accordance therewith. The transducer rod comprises alternate bands of magnetic and non-magnetic material with the distance between the alternate magnetic bands corresponding to the distance between respective ones of the various discrete locations obtainable by the head bearing member.

The transducer rod comprises the core of a linear differential transformer. The transformer is stationary with respect to recording apparatus and located at a sensing point which is selected such that when one of said magnetic bands is centered thereabout, each of the read/write heads will be precisely located over respective ones of the recording tracks associated with that location.

The differential transformer is positioned at the sensing point such that when one of the magnetic bands is precisely centered about the sensing point, the output from the transformer will be balanced. In this manner, should the head bearing member be slightly displaced in one direction or the other from the selected discrete location causing the read/write heads to be displaced from the recording tracks, the transformer will generate an output having a phase and magnitude proportional respectively to the direction and magnitude of the displacement.

A phase sensitive detector is provided to convert the output of the transformer to a D.C. signal, the polarity and magnitude of which is dependent upon the phase and magnitude of the transformer output. The output from the detector is connected as the input to a summing operational amplifier, the output of which constitutes a positional error signal.

This resulting error signal is then fed to the drive mechanism to cause this mechanism to drive the head bearing member in such a direction as to reduce the error voltage to zero, or null, at which time each of the heads will be precisely and accurately positioned above the recording tracks which correspond to the particular location associated with the magnetic band located at the sensing point.

Further, the present invention provides means for selectively generating an off-set current to cause the operational amplifier to have an output at the null position. This off-set is effective to cause the drive mechanism to shift the head bearing member an amount equal to the distance between adjacent recording tracks to, in effect, expand the number of possible discrete positions.

In other position sensing applications, transducer rods have been used in combination with magnetic sensing elements. These transducer rods generally comprise a base rod with a plurality of alternate magnetic and non-magnetic, center-apertured slugs mounted thereon.

In applications where a high degree of positional sensitivity is required, these prior known transducer rods are wholly unsatisfactory due to dimensional variations which cannot be economically eliminated and errors caused by differences between the thermal coefficients of expansion of the transducer rod assembly and the structure upon which it and the element to be positioned are mounted.

The dimensional variations, or more accurately, dimensional inaccuracies, are a result of the slug and supporting rod arrangement. The dimensional tolerances of each of the plurality of slugs are stacked, or additive due to endwise stacking of the slugs on the support rod. To machine each slug to acceptable tolerances so that the overall dimensional accuracy is acceptable would be prohibitively expensive.

The thermal expansion problem is also a result of the plural slug construction. In most cases it is either impractical or impossible to match the combined coefficient of thermal expansion of the magnetic and non-magnetic slugs to that of the frame structure so that under wide temperature range conditions, the thermal expansion of the various members will introduce unacceptable errors.

The transducer rod constructed and employed in accordance with the teachings of the present invention eliminates the problems experienced in the prior known apparatus. In accordance with the present invention, the transducer rod is fabricated by machining a plurality of spaced transverse grooves in a non-magnetic rod, the spacing between the grooves corresponding to the spacing between the discrete locations, obtainable by the rough positioning mechanism. The entire surface of the rod is then plated with a magnetic material and then ground so that alternate bands of magnetic and non-magnetic material comprise the surface of the rod.

A transducer rod constructed in this manner completely avoids the tolerance stacking problem of prior known transducer rods. A rod of this type also eliminates the differential thermal expansion problem since the coefficient of thermal expansion of the plated transducer rod is approximately equal to that of the non-magnetic rod which can be appropriately selected to be equal to the thermal coefficient of expansion of the frame structure upon which the positioning mechanism is mounted.

The present invention may be better understood by reference to the following detailed description in conjunction with the attached drawings in which.

Figure 3:
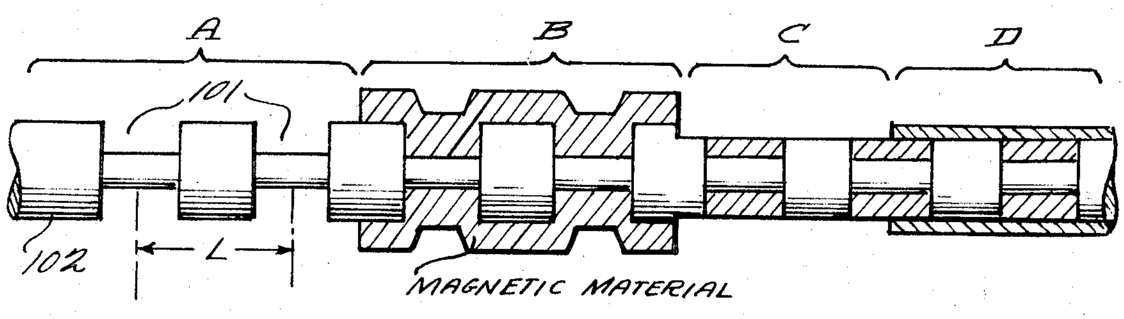
Figure 4:
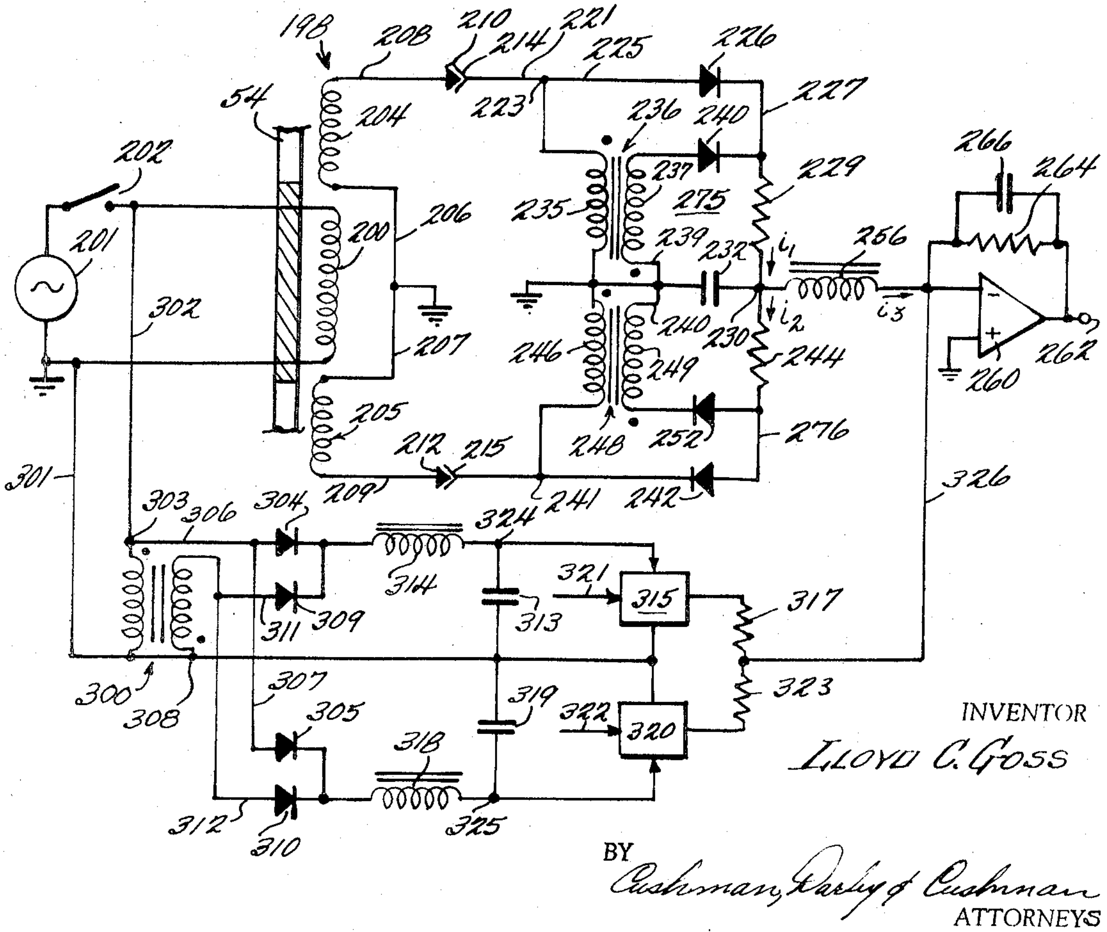
Figures 5, 5A:
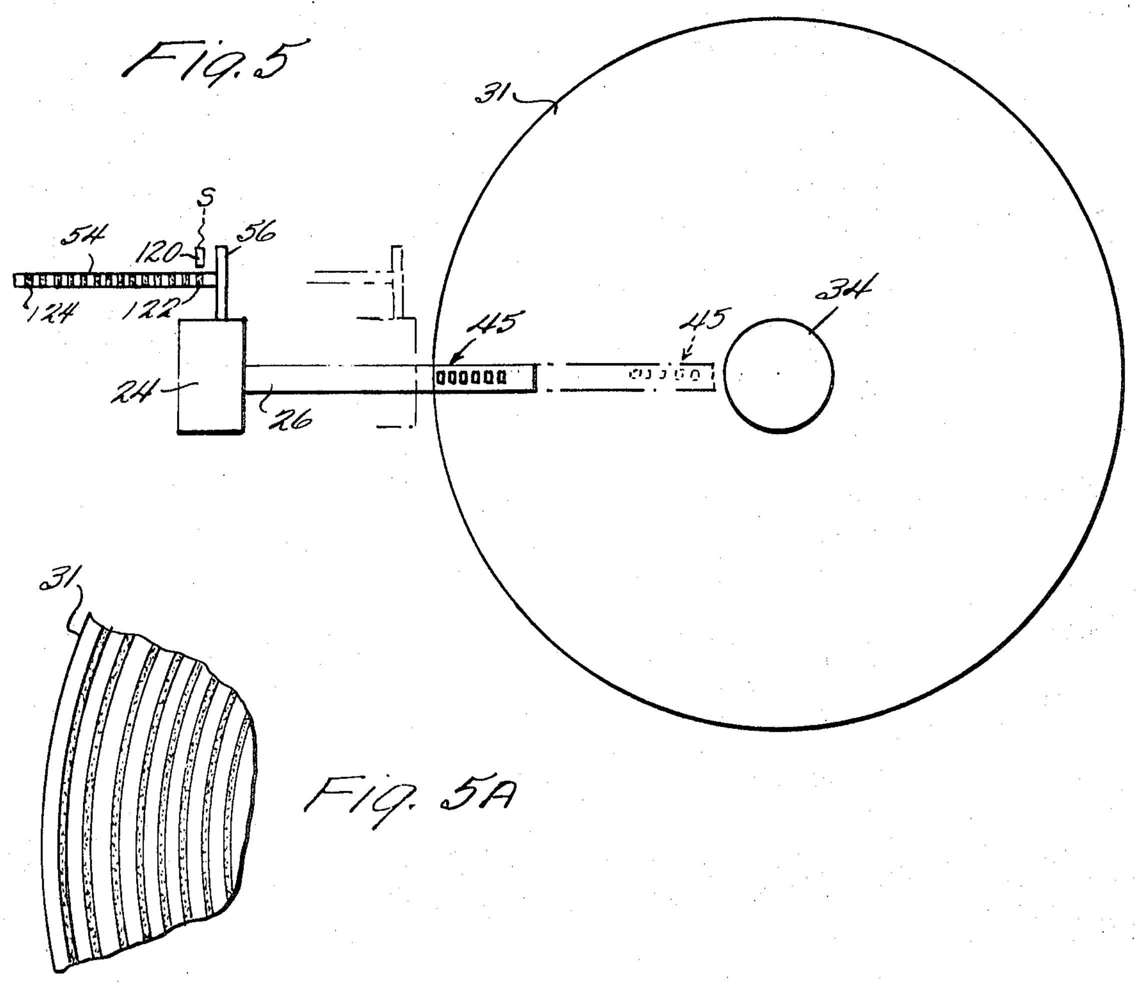
Figure 6:
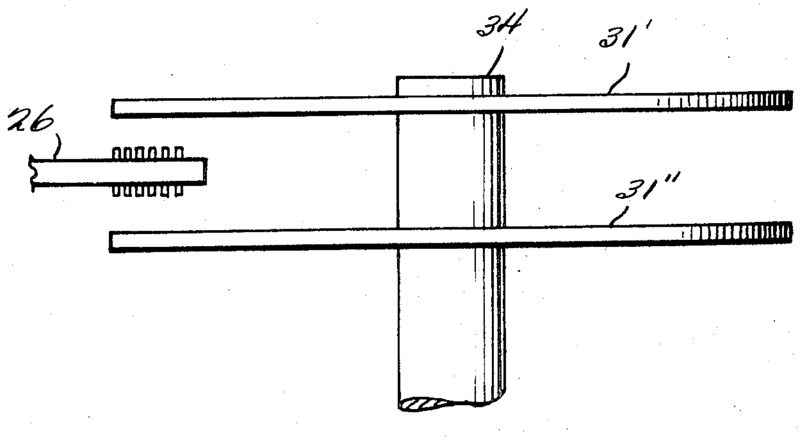

FIG. 3 illustrated the method of manufacture of the transducer rod in accordance with the present invention;

FIG. 4 is a schematic diagram of the preferred embodiment of the electronic control circuitry of the present invention;

FIG. 5 is a diagrammatic illustration of the spacial relationship between the transducer rod and the recording discs;

FIG. *5a* is an enlarged fragmentary view of the surface of the recording discs; and FIG. 6 is a diagrammatic illustration of the relationship between one of the head bearing support members and two adjacent recording discs.

The present invention will be described hereinafter in combination with the disc file magnetic storage and retrieval system shown in FIGS. 1 and 2, however, it is to be understood that the present invention is not to be limited thereto but is adapted for use in any system wherein a member is to be accurately positioned at any one of a plurality of discrete locations.

Figure 1:
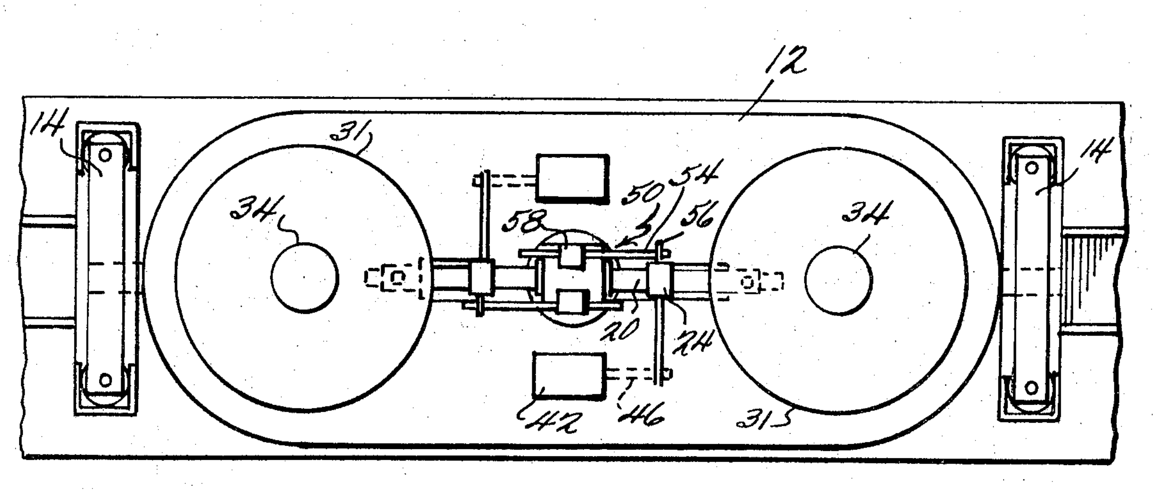
FIG. 1 is a top plan view of a disc file information storage and retrieval apparatus incorporating the position sensing and control apparatus of the present invention.
Figure 2:
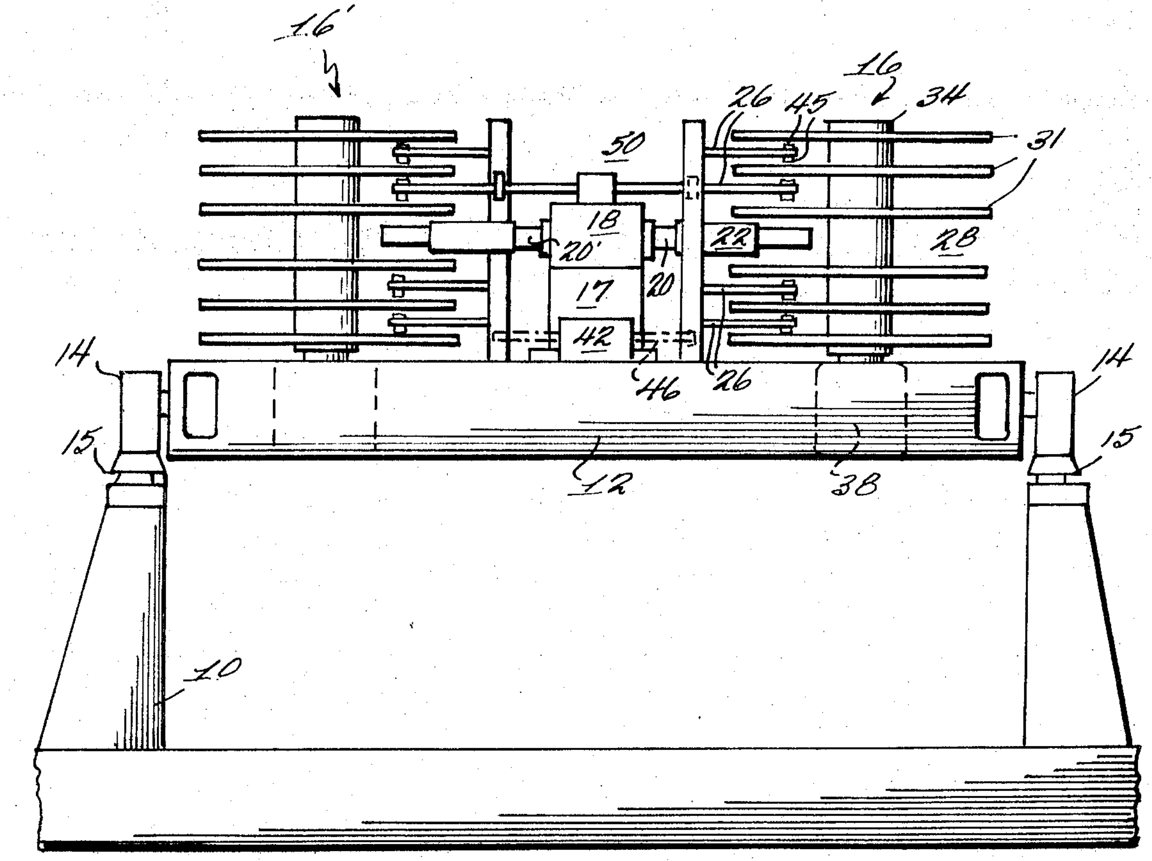
FIG. 2 is a front elevation of the apparatus shown in FIG. 1.

The disc file information storage and retrieval system shown in FIGS. 1 and 2 comprises a main frame structure 10 and a center casting 12 which is supported at either end in brackets 14. The brackets 14 are secured to the main frame 10 in any suitable manner such as by rubber shock mountings 15.

The center casting 12 is employed to support the primary functioning components, two disc file systems 16 and 16'. The disc file systems are identical and therefore only the system 16 will be described in detail herein. The disc file system 16 comprises a common pedestal mount 17 and hydraulic porting manifold 18 and a hydraulic actuator 20. The porting manifold is adapted to be connected to a suitable source of hydraulic pressure (not shown. The carriage bearing member 22 is slidably mounted on guide rails (not shown).

Electromechanically operated servo valves, or solenoid operated valves (not shown) which are mounted on the hydraulic porting manifold 18 are adapted to be selectively opened to drive the carriage bearing members in either of the two possible directions along the actuator assembly. The particular valves and their operation are well known and therefore are not shown in detail herein. Drive means, other than the hydraulically operated type shown, may, of course, be used such as mechanical gear drive, solenoid drive mechanisms and the like.

The head arm support carriage 24 is fixedly secured to the carriage bearing member 22 and functions to support, in cantilevered fashion, the head bearing support arms 26. The disc file 28 comprises a plurality of rotatable recording discs 31, which are supported on the shaft 34 of the disc drive motor 38. The motor 38 is mounted in the center casting 12 and is adapted to drive the discs of the file 28 at substantially constant rate of rotation.

A rough major positioning control mechanism, generally indicated at 42, is provided to selectively position the carriage member 22 and consequently the schematically illustrated read/write heads 45 (shown in detail in FIG. 6) at any one of a plurality of discrete major locations over the radius of the discs 31. The rough positioning control mechanism 42 is a conventional closed loop servo mechanical apparatus wherein the dotted line 46 schematically indicates a mechanical position feedback to the control mechanism. The details of the control mechanism 42 as well as the feedback connections are not shown in detail herein as they form no part of the present invention and may be of any suitable and well known construction. The control mechanism 42 is adapted to generate a control signal for the hydraulic actuator 20 in response to an input command signal, in the form of an address from a digital computer (not shown) to cause the hydraulic actuator 20 to position the carriage bearing member 22 at the particular one of the plurality of major locations corresponding to the particular address input command.

The fine or minor positioning control mechanism, generally indicated at 50, is provided to precisely position the carriage bearing member 22 at the particular major location corresponding to the input command signal to the major positioning control member 42. The minor positioning control mechanism generally comprises a transducer rod 54, fixedly secured at one end to the head arm support carriage, by any suitable means such as bracket 56, and a magnetic transducer element 58 and error signal generating circuitry (not shown). The fine or minor positioning control mechanism is effective to precisely maintain its associated carriage bearing member at the major location selected by the rough positioning control mechanism.

The fine positioning control circuitry is also provided with means to selectively generate a "bogus" error signal of a predetermined polarity and magnitude to shift the head bearing support arms a limited amount in either direction from the major location.

The fine positioning control mechanism 50 is shown in detail in FIGS. 3 and 4. In FIG. 3 the method of fabricating transducer rod 54, which is used in the fine positioning control mechanism, is illustrated. The method of fabricating comprises four steps, generally indicated at A, B, C, and D. In step A, a plurality of spaced transverse grooves 101 are machined in the non-magnetic, metallic rod 102. The number of grooves machined in the rod is equal to the number of selectable major locations at which the head bearing support arms may be positioned, and the spacing L between adjacent grooves is selected to correspond to the distance between the respective adjacent major locations.

In step B, the entire rod is plated with a magnetic material such as nickel iron alloy, by any suitable process such as by electroplating, vacuum deposition or the like, to a depth at least equal to the depth of grooves 101.

In step C, the plated rod is reduced in diameter by grinding, for example, to a final diameter which is no greater than the original diameter of the unplated rod and preferably of a slightly smaller diameter whereby the surface of the finished rod as shown in section C of FIG. 3 comprises alternate magnetic and non-magnetic bands.

In step D, the rod is plated with a thin coating of a hard non-magnetic material such as non-magnetic electroless nickel to form a good wear surface.

As an example of a rod suitable for use in the present invention, the grooves are machined to a depth of .01 inch and plated with a nickel iron alloy to a depth of .01 inch. The plated rod is then ground to reduce the diameter .015 inch. The non-magnetic material is then applied to a depth of .0002 inch. The width of the grooves is 0.20 inch and the spacing therebetween is 0.17 inch.

By suitable mathematical analysis it can be shown that the combined coefficient of thermal expansion of the finished rod is approximately equal to the thermal coefficient of the non-magnetic rod alone. Therefore, assuming that the various structural components of the positioning mechanism of FIGS. 1 and 2 are made of aluminum, for example, errors due to differential thermal coefficients of expansion experienced in prior art devices can be substantially eliminated by selecting the non-magnetic rod to be of aluminum as well.

The magnetic transducing element 120 of the fine positioning control mechanism, which in accordance with a preferred embodiment of the present invention is a differential transformer, is disposed in operable relation to the transducer rod 54 at a point S (shown in FIG. 5 displaced from transducer rod 54 although in actuality the rod 54 passes through differential transformer 120) such that when the head bearing support arm is located at its outermost major location (with respect to the axis of the disc file) the first magnetic band 122 will be precisely centered with respect to the magnetic transducing element. Similarly, when the head bearing support arm is precisely located in its innermost major location, the last magnetic band 124 will be precisely centered with respect to the transducing element.

The phrase "centered with respect to said transducing element" may be better understood by referring to FIG. 4 wherein a portion of the transducer rod is illustrated as being disposed within a suitable differential transformer 198, to comprise the core thereof.

The differential transformer comprises a primary winding 200 which is connected to a suitable source of alternating current 201. The secondary, or output windings, 204 and 205 are connected to a reference potential such as ground by leads 206 and 207 respectively. The outer ends of windings 204 and 206 are connected by leads 208 and 209 to output terminals 210 and 212 respectively.

A portion of the transducer rod 54 is illustrated in FIG. 4 with one of the magnetic bands "centered with respect to the differential transformer." In this position, the magnetic band couples the primary winding equally to each of the secondary windings so that the output voltage appearing a terminals 210 and 212 are balanced, i.e., the magnitude of the potential at the terminals is equal.

In this configuration, should the transducer rod be displaced a minor degree in an upward direction, the potential appearing at terminal 210 will increase and the potential appearing at terminal 212 will decrease due to the mutual changes in coupling. The "minor displacement" refers to a displacement limited to the linear range of the differential transformer. More specifically, the displacement must not be so great as to completely decouple either of the secondary windings from the primary winding.

The output terminals 210 and 212 are adapted to be connected to the input terminals 214 and 215, respectively, of a "balanced-quad," phase sensitive detector 275. The input terminal 214 is connected via lead 221 to junction 223 which in turn is connected via lead 225, diode 226, lead 227 and summing resistor 229 to the common node 230. The common node 230 is connected to ground through a filter capacitor 232. The junction 223 is also connected to ground through the primary winding 235 of an inverting transformer 236. The secondary 237 of the inverting transformer 236 is connected at one end to ground by lead 239 and at the other end to the summing resistor 229 by diode 240.

The junction 241 is similarly connected to the summing node 230 through a diode 242 and summing resistor 244 and to ground through the primary 246 of an inverting transformer 248. The secondary 249 of the inverting transformer 248 is connected to ground at one end by lead 240 and at the other end to summing node 230 by diode 252 and summing resistor 244.

One to one inverting transformer 236 couples a voltage equal in magnitude and opposite in phase to that developed across winding 204 to diode 240.

Diodes 226 and 240 produce a full wave rectified voltage of positive polarity at wire 227 which is proportional to the output voltage of secondary winding 204. This voltage creates a full wave rectified current $i_1$ in resistor 229 which is also proportional to the output voltage of secondary winding 204.

One to one inverting transformer 248 couples a voltage equal in magnitude but opposite in phase to that developed across winding 205 to diode 252.

Similarly, diodes 242 and 252 produce a full wave rectified voltage of negative polarity at wire 276 which is proportional to the output voltage of secondary winding 205. This voltage creates a full wave rectified current $i_2$ in resistor 244 which is also proportional to the output voltage of secondary winding 205.

When the output of the differential transformer is balanced, the currents $i_1$ and $i_2$ are equal and therefore the current $i_3$, which is the sum of these currents is zero. This situation is true only so long as the summing resistors 229 and 244 are of equal value. Should the output of the differential transformer become unbalanced due to a minor upward displacement of the magnetic band from its centered position, the current $i_1$ will increase and the current $i_2$ will decrease, resulting in a positive current $i_3$ flowing out of the summing node. The inductor 256 and capacitor 232 act as a low pass filter to eliminate the effects of higher order harmonics introduced in the detector.

This current is connected through the inductance 256 to the negative input terminal of the operational amplifier 260. The positive input of the operational amplifier is grounded and the output at terminal 262 is fed back to the negative input terminal through feedback resistor 264. A conventional compensating capacitor 266 is connected in parallel to the feedback resistor. In this manner the output at terminal 262 will be equal in magnitude to the input but opposite in phase and comprises the position error signal. The phase reversal is immaterial in the operation of this invention.

The output error signal is connected by suitable means (not shown) to the hydraulic actuators (FIG. 1) to maintain the carriage bearing assembly precisely positioned at the major location associated with the particular magnetic band located within the differential transformer.

The switch 202, connected between the source 201 and the primary winding of the differential transformer, is adapted to be closed to thereby energize the fine positioning mechanism after the rough positioning mechanism has completed its positioning function in response to an input command thereto. The control may be derived from either the computer or the rough positioning control mechanism in any suitable manner. For example, the switch may comprise the normally open contacts of a relay, or other suitable controllable switching device, which is energized by a signal generated in response to the position feedback to the rough positioning control system becoming equal to the input address command. Well known apparatus, responsive to a null condition input to generate an output, may be used for this purpose.

A minor location select capability is also provided by the present invention and comprises broadly the generation of a bogus error signal at the output of the operational amplifier. This may be accomplished in one of several ways including internally off-setting the balance within the operational amplifier, independently generating an off-set current to be selectively connected to the input of the operational amplifier or by selectively varying the impedance of one or the other of the summing resistors 229, 244.

In accordance with the preferred embodiment of the present invention, the bogus error signal is obtained by adding to or subtracting from current $i_3$ selected off-set currents. The circuitry for creating the bogus error signal is shown in FIG. 4 and comprises a pair of rectifiers, consisting of transformer 300 and diodes 304, 305, 309 and 310; a pair of filters consisting of inductances 314 and 318 and capacitors 313 and 319; a pair of electronic switches 315 and 320; and a pair of resistors 317 and 323. The rectifier-filter combination consisting of transformer 300, diodes 304 and 309, inductance 314 and capacitor 313 produces a positive reference voltage at its output node 324 while the rectifier-filter combination consisting of transformer 300, diodes 305 and 310, inductance 318 and capacitor 316 produces a negative reference voltage at its output node 325. Electronic switch 315, when closed in response to a computer command, applies a positive reference voltage to resistor 317 thereby applying positive current to the input of operational amplifier 260. Electronic switch 320, when closed in response to computer command, applies a negative current to the input of operational amplifier 260. The direction of flow of the offset current determines the direction in which the operating point of operational amplifier will shift.

As shown in FIG. 4, the AC signal which excites the transducer is also connected to the primary winding of transformer 300 via leads 301 and 302. Lead 301 also provides the ground bus for the circuit. The end, designated 303, of the primary winding of transformer 300 is also connected to the anode of diode 304 and the cathode of diode 305 via leads 306 and 307. One end of the secondary winding of transformer 300 is grounded while the other end is connected to the anode of diode 309 via lead 311 and the cathode of diode 310 via lead 312. The cathodes of diode pair 304 and 309 are connected to a first end of inductance 314 while the anodes of diode pair 305 and 310 are connected to a first end of inductance 319. The second end of inductance 314 is connected to capacitor 313 at node 324 and also to electronic switch 315 while the second end of inductance 318 is connected to capacitor 319 and to electronic switch 320. As explained above, application of a signal from the computer to an electronic switch causes a reference current to be applied to the input of operational amplifier 260.

In order to fully understand the operations of the present invention in conjunction with the disc file system shown in FIGS. 1 and 2, the relationship between the recording heads and the recording tracks must be understood.

With reference to FIGS. 5 and 6, it can be seen that head bearing support arm carries twelve separate read/write heads. Six of these heads are located on the upper side of the support arm to read the tracks on the underside of record 31′ and the other six heads are located on the other side of the support arm to read or write on the tracks located on the upper side of disc 31″.

The discs themselves contain two hundred and fifty-two concentric recording tracks, as indicated in FIG. 5*a*, on each surface.

The rough or major positioning control mechanism is adapted to position the head bearing support arm in any one of fourteen discrete radial major locations. In other words, each set of recording heads is positionable at fourteen different locations.

The transducer element schematically indicated at 120, is positioned such that when the head bearing support rod is located at its outermost radial position, the first of the fourteen magnetic bands, 122, will be centered with respect thereto. This position is shown in full lines in FIG. 5. When the head bearing member is at its innermost location, as shown in dotted lines, the last magnetic band 124 will be centered with respect to the transducer 120.

Absent further positioning capability, only eighty-four of the two hundred and fifty-two total tracks on a given side of a disc are accessible. In order to render all two hundred and fifty-two tracks accessible, the current offset feature described hereinbefore with respect to FIG. 4 is provided to finely position the head bearing support arms at any one of three minor locations for each major location selectable by the rough positioning mechanism.

The off-set current created by resistors 317 and 323 (FIG. 4) in conjunction with electronic switches 315 and 320 is selected to be of such a magnitude as to cause the hydraulic actuators to shift the carriage support member an amount equal to the spacing between adjacent tracks. The sense of the off-set current determines the direction that carriage support will be shifted. In this manner, all two hundred and fifty-two tracks are rendered accessible. This can be verified by considering that six recording heads are positionable at three minor locations for each of fourteen major locations, and by principles of permutation mathematics, the total available positions are determined by the product of these numbers.

The disc file recording apparatus is particularly well suited to be controlled by a computer to select a particular track to which or from which information is to be read. In operation, the computer will supply the rough positioning control system associated with the file in which the desired track is located with an address corresponding to the major location at which that track is located. The minor positioning apparatus will be disabled at this point.

The rough positioning apparatus will cause the hydraulic actuator to locate the carriage support member at that particular major location at which time the fine positioning control apparatus will be actuated by the closing of switch 202 to maintain the magnetic band on the transducer rod 54 which corresponds to this location, centered with respect to the differential transformer, or shifted to one of the minor locations if the particular track is located in the minor location. The computer is effective to select a minor position by supplying a track address, a portion of which is decoded into the signal required to close either electronic switch 315 or 320 (FIG. 4).

From the foregoing description, it can be appreciated by those skilled in the art that the present invention provides an extremely accurate and economical position control system, virtually insensitive to temperature variations, which is capable of use in a wide variety of systems and is not limited to use in informtaion storage systems of the disc type which is described hereinbefore, merely as a preferred embodiment.

Similarly, it will be apparent from the foregoing to those skilled in the art that this invention is amenable to a variety of modifications with respect to the mechanical components, circuitry and electrical components, and hence may be given embodiments other than those particularly illustrated and described herein without departing from the essential features of the present invention and within the scope of the claims appended hereto.

I claim:

1. Apparatus for accurately positioning a member at a preselected one of a plurality of spaced discrete locations comprising:

controllable drive means for accurately positioning said member in response to a position error signal, control means for generating said position error signal, said control means comprising a transducer rod movable in accordance with the movement of said member, said transducer rod comprising a non-magnetic rod having a plurality of spaced transverse grooves therein corresponding to said plurality of discrete locations, said grooves having a magnetic material disposed therein, magnetic transducer means comprising a single differential transformer having a primary winding and two interconnected secondary windings, the transformer being disposed in operative relation to said transducer rod at a point spaced from said discrete locations such that when said member is accurately located at said preselected location, the corresponding groove is centered with respect to said primary winding whereby the secondary windings are equally coupled to the primary winding through the agency of the magnetic material in said groove, said transducer being effective to generate a signal whenever said member undergoes a minor displacement from said preselected discrete location to thereby disrupt equal coupling between the primary and secondary windings, the phase and magnitude of said signal being dependent upon the magnitude and direction of said minor displacement, and error signal generating means responsive to the signal generated by said transducer to generate said positional error signal to cause said drive means to move said member in such a direction so as to reduce said error voltage to zero.

2. The apparatus of claim 1 wherein the spacing between said grooves corresponds to the distance between said plurality of discrete locations.

3. The apparatus of claim 1 further comprising means for selectively causing said error signal generating means to generate a bogus error signal to cause said controllable drive means to shift said member to one of a plurality of minor locations.

4. The apparatus of claim 1 wherein the output signal from said transducer means comprises an alternating current signal and wherein said means for generating said positional error signal comprises a phase sensitive detector, the output of which comprises a direct current signal having a magnitude and polarity dependent upon the magnitude and phase of the alternating current signal generated by said transducer.

5. The apparatus of claim 4 further comprising an operational amplifier having an input and an output, means connecting the output from said phase sensitive detector to said input, and means connecting the output of said operational amplifier to a said controllable drive means.

6. The apparatus of claim 5 further comprising means for selectively generating an offset current for said operational amplifier to cause the output thereof to control said controllable drive means to shift the position of said member an amount proportional to said offset current.

7. The apparatus of claim 4 wherein said phase sensitive detector comprises first and second input terminals connected to the output of said transducer, first and second unidirectional conducting means, first and second summing impedances and a summing node, means connecting said first unidirectional conducting means and said first summing impedance in series between said first input terminal and said summing node, means connecting said second unidirectional conducting means and said second summing impedance in series between said second input terminal and said summing node, said first and second unidirectional conducting means being poled to conduct in opposite directions with respect to said summing node, and an output terminal connected to said summing node.

8. The apparatus of claim 7 further comprising first and second inverting transformers each having a primary winding and a secondary winding, means connecting the primary winding of said first inverting transformer between said first input terminal and a reference potential, means connecting the primary winding of said second transformer between said second input terminal and said reference potential, means connecting the secondary winding of said first transformer and a third unidirectional conducting means in series between said source of reference potential and said first summing impedance, and means connecting the secondary winding of said second inverting transformer and a fourth unidirectional conducting means in series between said source of reference potential and said second summing impedance, said third and fourth unidirectional conducting means being poled to conduct in same direction as said first and second unidirectional conducting means, respectively.

9. Apparatus for accurately positioning a read/write head bearing member at any one of a plurality of major locations over a greater plurality of concentric recording tracks comprising:

major positioning means for roughly positioning said head bearing member at any one of said plurality of discrete major locations, and minor positioning means for positioning said head bearing member at one of a plurality of minor locations associated with each major location, one of said plurality of minor locations corresponding to its associated major location, said minor positioning means comprising a transducer rod movable in accordance with said head bearing member, the surface of said transducer rod comprising alternate magnetic and non-magnetic bands, the spacing between said magnetic bands corresponding to the spacing between said discrete major locations, magnetic transducer means disposed in operative relation to said transducer rod at a point fixed with respect to said discrete locations such that each of said magnetic bands is centered with respect to said magnetic transducer means whenever said head bearing member is accurately disposed at one of said major locations, said transducer being effective to generate an output signal whenever said head bearing member undergoes minor displacements from said discrete locations, error signal generating means responsive to the signal from said transducer to generate an error signal, servo positioning means responsive to said error signal to drive said head bearing member in such a direction as to reduce said error voltage to zero, and means for causing said error signal generating means to generate a bogus error signal to shift said head bearing member a distance corresponding to the distance between adjacent ones of said plurality of recording tracks.

References Cited

UNITED STATES PATENTS

| | | | |
|---|---|---|---|
| 2,430,757 | 11/1947 | Conrad | 336—136 |
| 2,614,164 | 10/1952 | Huston | 336—136 |
| 3,009,759 | 11/1961 | Johnson et al. | 340—174.1 |
| 3,242,472 | 3/1966 | Anthony | 336—136 |
| 3,246,307 | 4/1966 | Stanley | 340—174.1 |

BERNARD KONICK, Primary Examiner

W. F. WHITE, Assistant Examiner

U.S. Cl. X.R.

318—18; 336—136